United States Patent Office 3,183,587
Patented May 18, 1965

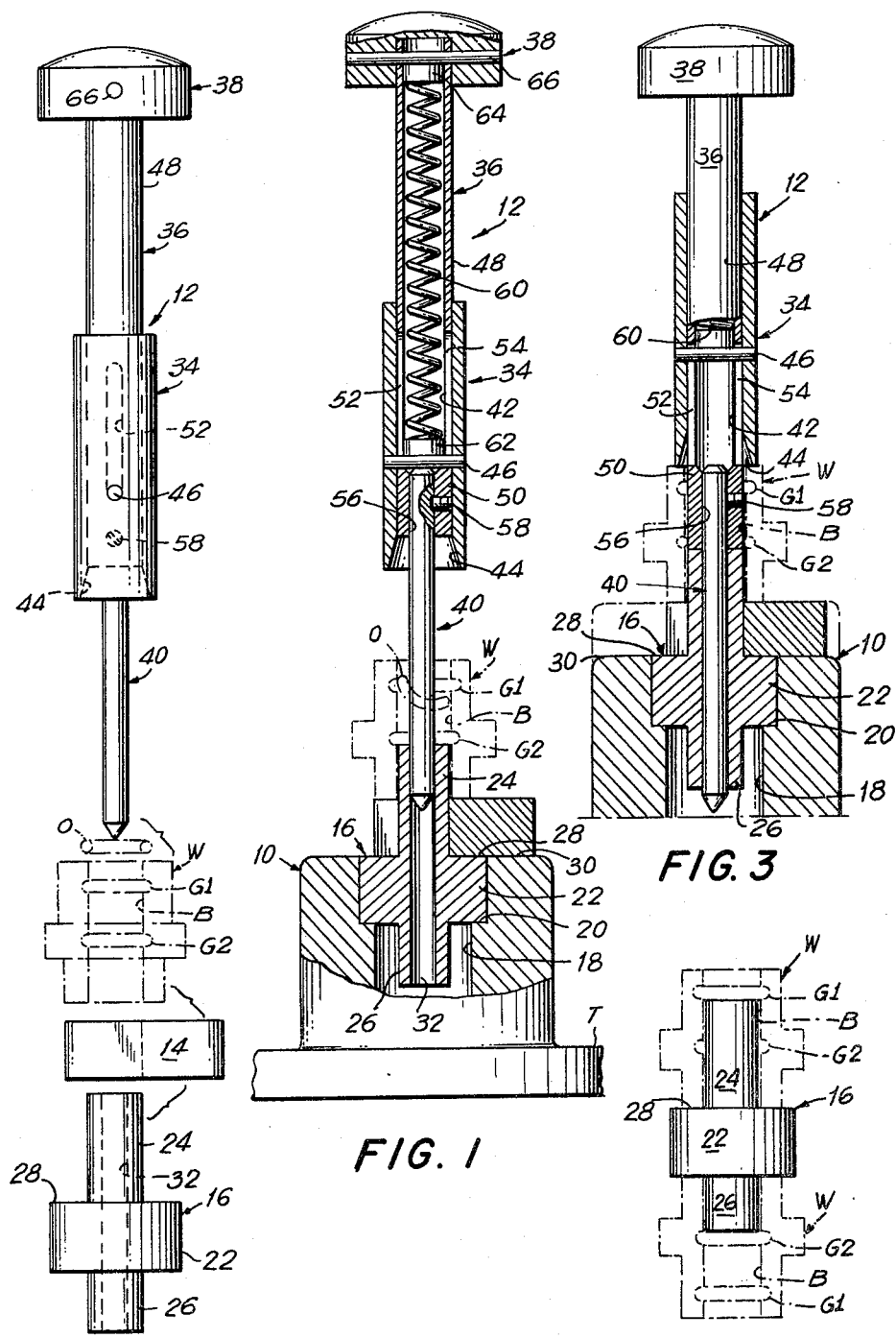

3,183,587
ASSEMBLY METHOD
Raymond C. Baskell, Trumbull, Conn., assignor to
Jenkins Bros., Bridgeport, Conn.
Original application May 16, 1961, Ser. No. 110,387, now
Patent No. 3,149,413, dated Sept. 22, 1964. Divided
and this application Oct. 22, 1962, Ser. No. 233,999
2 Claims. (Cl. 29—451)

This invention relates to assembly methods and more particularly to techniques for assembling toroidal elements in supporting bodies. This application is a divisional based on my earlier application, Serial No. 110,-387, filed May 16, 1961, now Patent No. 3,149,413.

A particular problem contemplated by the invention relates to the assembly operation involving depositing an O-ring in an annular groove encircling a bore within a workpiece and, with respect to this problem, it is an object of the invention to provide improved techniques to facilitate said operation.

More particularly, it is an object of the invention to provide improved techniques whereby an O-ring may be positioned in an annular groove efficiently, precisely and without damage.

Further, it is an object of the invention to permit the locating of O-rings and the like in remote and inaccessible positions within supporting bodies.

According to the method of the invention, an O-ring is placed in an annular groove encircling a bore in a workpiece by obturating the bore adjacent the groove and driving said O-ring through said bore against the obturation whereby the O-ring is deposited in the groove.

The invention will be more clearly understood from the following detailed description as illustrated in the accompanying drawing in which:

FIGURE 1 is a partially sectional view of an assembly tool prepared for inserting an O-ring in a workpiece in accordance with the invention;

FIGURE 2 is an exploded elevational view of various of the components illustrated in FIG. 1;

FIGURE 3 is a partially sectional view illustrating the apparatus of FIG. 1 with the O-ring having been positioned; and FIGURE 4 is a view showing a possibility of using an element of FIG. 1 in inverted position for purposes of depositing O-rings at various depths.

The assembly tool illustrated in the drawing generally comprises a base member 10 and a hammer member 12. A bifurcated spacer 14 may also be employed.

In the drawing, base member 10 is shown positioned on a table T, the apparatus being adapted for positioning an O-ring in annular grooves G1 and G2 which encircle and are concentric with a bore B extending through a workpiece W. Grooves G1 and G2 open inwardly into bore B and are located at varying depths within the workpiece W, or in other words, are displaced by different axial extents along said bore.

Also constituting a basic element of the assembly tool illustrated is the detachable insert 16, the purpose of which will become hereinafter apparent.

Base member 10 may be fabricated, for example, of aluminum, steel, or the like, and is provided with an upwardly extending opening 18 in which a shoulder 20 provides a support for the detachable insert 16.

The detachable insert 16 includes a first section 22 having a shape corresponding to that of the upper portion of opening 18, section 22 being adapted for being supported directly against the shoulder 20.

Insert 16 further includes a second section or stop 24 extending vertically upward from section 22 and having a generally cylindrical shape. The diameter of section 24 is substantially equal to, but less than, the diameter of bore B, whereby the workpiece W is adapted for being slidably and detachably accommodated on the section 24.

Detachable insert 16 is furthermore provided with an additional section 26, the purpose of which will be hereinafter explained.

Additionally, it is to be noted that the top 28 of section 22 is preferably planar and merges with the top 30 of the base member 10.

Finally, with respect to detachable insert 16, it is to be noted that this member is provided with a bore or opening 32, having a particular determinable diameter, the use of which will hereinafter be made apparent.

Hammer member 12 includes a cylindrical sleeve 34, a cylindrical anvil 36, a head 38 and a rod 40.

Cylindrical sleeve 34 is preferably fabricated of aluminum or steel, or the like, and is provided with an inner cylindrical bore 42, the diameter of which is substantially equal to the diameter of the bore B in workpiece W. Bore 42 flares outwardly at an angle of about 15° to a diameter substantially equal to about the outer diameter of grooves G1 and G2 and O-ring O. Thus, the inner end of sleeve 34 is constituted by a flared portion 44.

With further regard to sleeve 34, it will be noted that this sleeve is diametrally penetrated by a pin 46 affixed to said sleeve.

The anvil 36, slidably accommodated within the sleeve 34, comprises generally a first portion 48, which is hollow, and a second portion 50, which is for the most part solid. Hollow portion 48 is provided with diametrally opposed and axially elongated slots 52 and 54 within which is accommodated pin 46 which thereby limits the extent of relative movement possible between the sleeve 34 and anvil 36.

Solid portion 50, which is of generally cylindrical form, has a diameter which is substantially equal to, but slightly less than the diameter of bore 42 of sleeve 34. Moreover, solid portion 50 is provided with an axial opening 56 within which is accommodated rod 40. Rod 40 is fixed to solid portion 50 by means of a set screw 58.

Within the hollow portion 48 of anvil 36 is located a resilient or yieldable device such as the helical spring 60 which engages at opposite ends against wafers 62 and 64. The wafer 64, in turn, engages against pin 66 by means of which head 38 is affixed to anvil 36, the spring 60 thus urging the head 38 and the anvil 36 towards a predetermined position of rest relative to pin 46 and thus relative to the hollow sleeve 34. The position of rest is as illustrated in FIG. 1.

Rod 40 is provided with a diameter substantially equal to, but slightly less than the diameter of bore 32 and is therefore adapted to penetrate into the latter said bore. This enables the rod 40 to serve as a guide for the hammer member 12 and thus for the anvil 36.

For inserting an O-ring into one of the grooves in the workpiece W, the bifurcated spacer 14 is employed or not, depending upon which of the grooves the O-ring is to be inserted in. The height of spacer 14 is equal to the axial spacing between corresponding portions of grooves G1 and G2 and the workpiece W is positioned either atop the spacer 14 or atop section 22 of detachable insert 16. The selective use of spacer 14 governs the extent by which section 24 of detachable insert 16 pentrates into the bore B of workpiece W, the section 24 being intended to penetrate said bore to a position adjacent the groove in which the O-ring is to be deposited. The top of section 24 thus obturates the bore B and serves as a stop or abutment for the solid portion 50 of the anvil 36.

With the workpiece positioned as shown in phantom lines in FIG. 1, an O-ring is next positioned in the flared portion 44 at the bottom of sleeve 34. Rod 40 is then inserted through bore B into the bore 32 of detachable insert 16. Hammer member 12 is then moved vertically downward until it rests on the top of the workpiece W. A force is then applied vertically downward on the top of head 38 so that the solid portion 50 of the anvil urges the O-ring O downwardly through bore B to a position whereat the O-ring encounters the top of section 24. The O-ring no longer having freedom for axial movement through bore B snaps into position into the adjacent groove, the solid portion 50 continuing through the center of the O-ring until it encounters section 24 of detachable insert 16. With the O-ring thus in position, spring 60, with head 38 released, urges the anvil upwardly relative to sleeve 34, leaving the O-ring in position in the groove.

It will be apparent from an inspection of FIGS. 1–3 that if spacer 14 were to be removed, the workpiece W would be positioned further down along section 24 so that the top of the latter would be adjacent groove G1. This would enable the positioning of an O-ring within the latter said groove.

Alternatively, and as indicated in FIG. 4, detachable insert 16 can be employed in inverted position whereby on the one hand section 24 enables the positioning of the O-ring in one of the grooves in bore B and section 26 enables the positioning of an O-ring in a groove displaced axially therefrom.

It follows from the above description that the method of the invention proposes the obturating of a bore in a workpiece and the driving of an O-ring through the bore against the obturation whereby said ring is deposited in a groove adjacent this obturation.

There will now be obvious to those skilled in the art many modifications and variations of the method set forth above. These modifications will not depart from the scope of the invention, however, if defined by the following claims.

What is claimed is:

1. A method for positioning a resilient toroid in an annular groove encircling a bore in a workpiece at a determinable depth within the latter, the diameter of the toroid being larger than the diameter of the bore of the workpiece, said method comprising supporting the workpiece, inserting a stop in said bore from one end thereof to the extent of said depth, forcing said toroid into and through said bore from the other end thereof to the extent of abutting said stop such that the toroid is flattened in the plane of the groove, allowing said toroid to expand into said groove, and removing the stop from the bore.

2. A method of inserting a resilient annular ring into an annular groove encircling a bore in a workpiece, said ring having a diameter which is larger than the diameter of the bore of the workpiece, said method comprising inserting into one end of said bore a stop and positioning the same adjacent said groove, said stop having an opening therein, positioning said resilient ring on a rod having an anvil attached thereto, inserting said rod into said bore at the end thereof opposite said stop to cause said rod to extend into said opening to guide said anvil, forcing said anvil and thereby said ring into and through said bore until said ring encounters said stop and is flattened in the plane of the groove, allowing said ring to expand into said groove, and withdrawing the anvil, rod and stop from said bore.

References Cited by the Examiner
UNITED STATES PATENTS
2,357,139    8/44    Seme _____ 29—229

WHITMORE A. WILTZ, *Primary Examiner.*

CHARLIE T. MOON, *Examiner.*